Sept. 2, 1952  G. E. HUGHES  2,609,177
AUTOMOBILE JACK
Filed Dec. 15, 1948

Inventor
George E. Hughes
By Fishburn & Mullendore
Attorneys.

Patented Sept. 2, 1952

2,609,177

UNITED STATES PATENT OFFICE 2,609,177

AUTOMOBILE JACK

George E. Hughes, Kansas City, Mo.

Application December 15, 1948, Serial No. 65,314

1 Claim. (Cl. 254—93)

This invention relates to a lifting device and more particularly to a jack adaptable for the raising of automobiles or the like.

The invention contemplates using an inflatable member for lifting the automobile and for collapsing in an accordion-like structure when deflated. With devices of this character, considerable pressure is placed on the flexible container and such a container requires considerable rigidity to withstand the strain placed thereon when raising the automobile.

The principal objects of the present invention are to provide a collapsible member adapted to be inflated with a fluid medium to expand the same, which when placed under the frame or bumper of an automobile will raise a wheel thereof from the ground; to provide the walls of said body member with sufficient rigidity to withstand the strain of the pressure medium inside the body member; to provide a body having two compartments; to provide means for admitting fluid to the respective compartments; to provide the compartments with inflatable bags or tubes to provide the top of the body member with means for engaging the vehicle; to provide a base for the body member so as to aid in preventing tipping of the device, and to provide a device of this character simple, economical to manufacture and efficient in operation.

In accomplishing these and other objects of the present invention, I have provided improved details of structure, the preferred forms of which are illustrated in the accompanying drawings, wherein.

Figure 1:
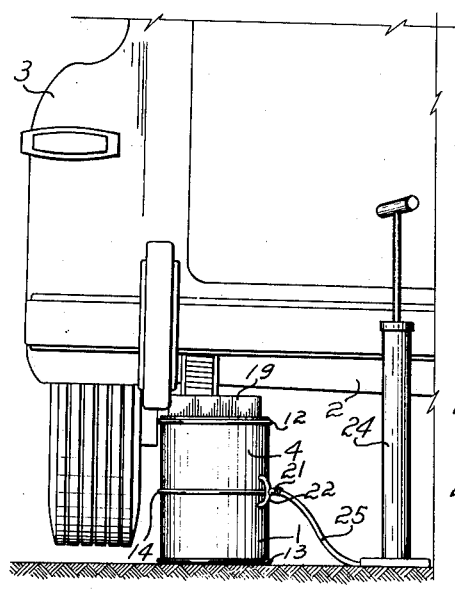
Fig. 1 is a perspective view of my lifting device placed under an automobile for raising the wheel thereof.

Referring more in detail to the drawings.

I designates a jack embodying the features of my invention adapted for engaging under the axle 2 of a motor vehicle 3. The device consists of a housing comprising, an exterior sheet of fabric material such as canvas or the like 4 and rigidly sealed on the inner side of which is a rubber or plastic material 5 forming a bellows-like covering for the housing. The housing has a top end 6, a bottom 7 and an intermediate partition 8 forming compartments 9 and 10 in the body of the housing. The outer perimeters of the top 6, bottom 7 and partition 8 are grooved as indicated at 11 (Fig. 2) the top, bottom and partition are preferably made of wood, aluminum or other light weight material.

The top and bottom of the covering 4, forming the housing are secured to the top 6 and bottom 7 by rings 12 and 13 adapted to engage over the covering 4 and press the same into the groove 11 of the top and bottom, to form an air-tight structure thereby. Also adapted to engage around the partition 8 is a ring 14 on the outside of the covering 4 to press the covering in the groove 11 of the partition to hold the partition rigidly in place and also to form the two compartments in the housing.

The rings 12, 13, and 14 are preferably made of rod-like material and have one end turned laterally and flattened as illustrated at 15 (Fig. 2) and the opposite end is turned laterally as indicated at 16 and thence parallel with the body of the rods and extends through an opening 17 in the flattened portion 15 and is provided with threads adapted to receive a nut 18 to tighten the rings on the body of the device.

Secured to the top 6 of the housing by any suitable means such as adhesive or screws or the like (not shown) is a plate 19 having a V-shaped groove 20 in the top surface thereof adapted to engage the part of the automobile under which the jack is placed so as to avoid slipping of the vehicle from the jack when in operation.

Figure 2:
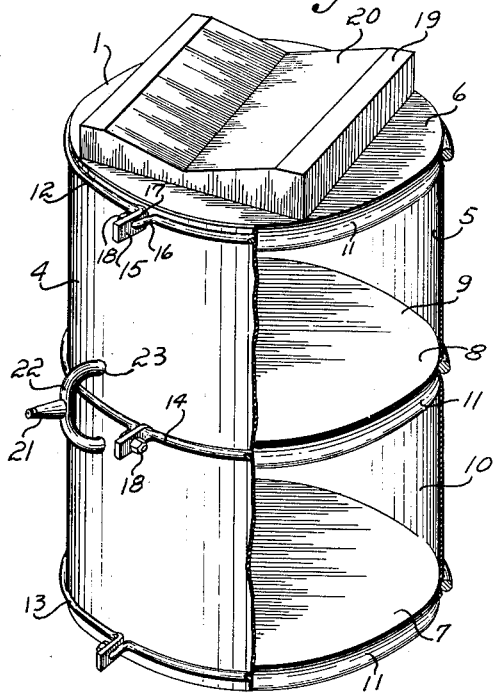
Fig. 2 is an elevational view of the device with parts broken away to better illustrate the invention.
Figure 4:
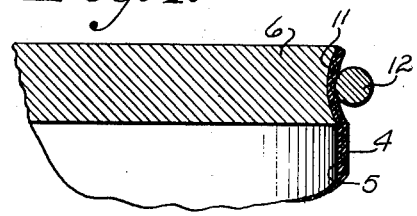
Fig. 4 is a fragmentary sectional view of one end of the device and the retaining rings.

A fluid, such as air, is admitted to the respective compartments 9 and 10 of the housing through a valve 21 seated in a substantially U-shaped tubular member 22 having its respective ends leading to the compartments 9 and 10 and sealed in the walls of the covering material 4 as indicated 23 (Fig. 2).

Figure 3:
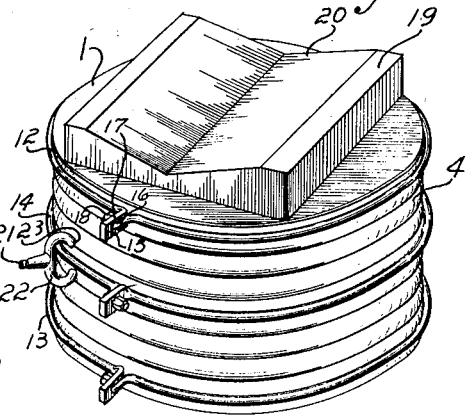
Fig. 3 is a perspective view of the device shown in collapsed position.

Operation of the device constructed and assembled as described is as follows:

The housing in deflated condition as shown in Fig. 3 may be placed under the part of the automobile desired to be raised and fluid, such as air, is forced into the respective compartments of the housing through valve 21 to thus expand the housing longitudinally to raise the automobile as illustrated in Fig. 1. An ordinary tire pump 24 having its hose 25 attached to the valve 21 may be used for forcing the air into the jack to inflate the same. Other fluid pressure may be supplied to the jack from any suitable source without departing from the spirit of my invention. When it is desired to remove the jack from underneath the vehicle the hose 25 is disconnected from the valve and the fluid exhausted from the housing so the same will deflate or collapse somewhat in the form of a bellows or accordion-like structure as illustrated in Fig. 3.

Figure 5:
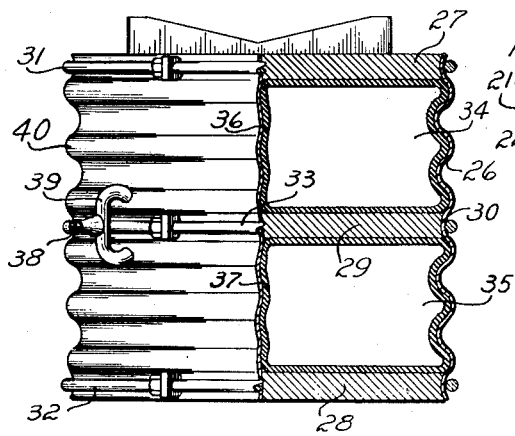
Fig. 5 is a modified form of invention showing the two compartments with the inflatable bags or tubes therein and parts broken away to better illustrate the invention.

In Fig. 5 there is shown a modified form of housing which comprises a bellows of fabric material such as canvas or the like 26, top 27, bottom 28 and partition 29 having grooves 30 formed in their outer perimeter the same as in the preferred form of the invention, and rings 31, 32 and 33 provided for engagement around the top, bottom and partition respectively also is in the preferred form of invention to form compartments 34 and 35 in the housing of the device.

Flexible rubber tubes or bags 36 and 37 are provided for fitting within the compartments 34 and 35 and are loosely applied therein. A valve 38 having a U-shaped tube 39 with its ends passing through the cover 26, has its ends sealed to the respective tubes 36 and 37 for supplying fluid to the respective tubes for extending the body member or housing as in the preferred form of invention. It will be obvious that any kind of impermeable material may be utilized for the tubes or bags; as well as the covering material in the preferred form of the invention. Operation of this form of device is substantially the same as that shown in Figs. 1 to 3 inclusive wherein when the air is admitted to the respective tubes the housing or body will be inflated longitudinally to raise the vehicle and when the air is exhausted therefrom the tubes will be collapsed in the form of a bellows or accordion-like structure as indicated at 40 (Fig. 5) so that the device will be collapsed to a small structure.

It will be obvious from the foregoing that I have provided an improved collapsible jack for raising objects, such as motor vehicles or the like, which may be collapsed and packed into small condition to require little room in transportation and a device which will support a vehicle in rigid position, and particularly with one wheel thereof off the ground will tend to prevent movement of the automobile forwardly or backwardly due to the substantial base of the lifting device.

What I claim and desire to secure by Letters Patent:

A pneumatic lifting device for a vehicle and the like comprising, a circular base having a groove around the periphery thereof, a normally collapsed expansible bellows of substantially non-resilient fabric having one end engaging the periphery of said base, means surrounding said one end of the bellows and fitting in the groove of the base to secure the bellows thereto, a circular top member of substantially the same diameter as the base and having a groove around the periphery thereof and engaged with the other end of the bellows, means surrounding said other end of the bellows and fitting in the groove of the top member to secure the bellows thereto, means on the top member for engaging portions of a vehicle to be lifted and retain same against relative lateral movement, rigid means secured in the bellows between the base and top member and forming a plurality of compartments therebetween, air retaining bags of impermeable resilient material within each compartment, and means for supplying air under pressure simultaneously to the bags for expanding same and extending the bellows to lift a vehicle, said bellows and bags being adapted to be collapsed into an accordion-like structure when the air pressure is released from the bags for removing the device from under the vehicle.

GEORGE E. HUGHES.

REFERENCES CITED

The following references are of record in the file of this patent:

UNITED STATES PATENTS

| Number | Name | Date |
|---|---|---|
| 184,461 | Cooper | Nov. 21, 1876 |
| 954,239 | Wylie | Apr. 5, 1910 |
| 1,745,959 | Steiner | Feb. 4, 1930 |
| 1,986,273 | Leffingwell | Jan. 1, 1935 |
| 2,001,744 | Patterson | May 21, 1935 |
| 2,328,970 | Farguhar | Sept. 7, 1943 |
| 2,361,832 | Eyles | Oct. 21, 1944 |
| 2,377,170 | Morgan | May 29, 1945 |
| 2,467,883 | Edwards | Apr. 19, 1949 |

FOREIGN PATENTS

| Number | Country | Date |
|---|---|---|
| 622,540 | Germany | Nov. 30, 1935 |